US011352467B2

(12) United States Patent
Brule et al.

(10) Patent No.: US 11,352,467 B2
(45) Date of Patent: Jun. 7, 2022

(54) USE OF AN ALLOY OF THERMOPLASTIC STARCH AND TPE IN THE MANUFACTURE OF AN ADHESIVE ULTRATHIN WATERPROOF-BREATHABLE FILM

(71) Applicant: ARKEMA FRANCE, Colombes (FR)

(72) Inventors: Benoît Brule, Beaumont-le-roger (FR); Guillaume Le, Colombelles (FR); Perrine Babin, Rouen (FR); Laurent B. Cartier, Wayne, PA (US); Frédéric Malet, Rouen (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/411,820

(22) PCT Filed: Jun. 7, 2013

(86) PCT No.: PCT/FR2013/051321
§ 371 (c)(1),
(2) Date: Dec. 29, 2014

(87) PCT Pub. No.: WO2014/001674
PCT Pub. Date: Jan. 3, 2014

(65) Prior Publication Data
US 2015/0166746 A1 Jun. 18, 2015

(30) Foreign Application Priority Data
Jun. 27, 2012 (FR) ........................................ 1256143

(51) Int. Cl.
C08J 5/18 (2006.01)
B29C 49/00 (2006.01)
B32B 27/40 (2006.01)
B32B 27/12 (2006.01)
B32B 5/02 (2006.01)
B32B 3/26 (2006.01)
B29C 48/08 (2019.01)
B29L 7/00 (2006.01)

(52) U.S. Cl.
CPC ................ C08J 5/18 (2013.01); B29C 48/08 (2019.02); B29C 49/0015 (2013.01); B32B 3/26 (2013.01); B32B 5/022 (2013.01); B32B 5/024 (2013.01); B32B 27/12 (2013.01); B32B 27/40 (2013.01); B29K 2003/00 (2013.01); B29L 2007/00 (2013.01); B32B 2250/02 (2013.01); B32B 2305/026 (2013.01); B32B 2307/7265 (2013.01); B32B 2437/00 (2013.01); B32B 2471/02 (2013.01); B32B 2479/00 (2013.01); C08J 2303/02 (2013.01); C08J 2367/02 (2013.01); C08J 2375/04 (2013.01); C08J 2375/08 (2013.01); C08J 2377/00 (2013.01); C08J 2377/12 (2013.01); C08J 2403/02 (2013.01); C08J 2475/04 (2013.01); Y10T 428/249983 (2015.04); Y10T 442/10 (2015.04); Y10T 442/3854 (2015.04); Y10T 442/674 (2015.04)

(58) Field of Classification Search
CPC ........... B32B 3/26; B32B 5/022; B32B 5/024; B32B 27/12; B32B 27/40; B29C 49/0015; C08J 5/18; C08J 2303/02; C08J 2367/02; C08J 2375/04; C08J 2375/08; C08J 2377/00; C08J 2377/12; C08J 2403/02; C08J 2475/04; B29K 2003/00; B29L 2007/00
See application file for complete search history.

(56) References Cited

U.S. PATENT DOCUMENTS

| 4,367,327 | A | * | 1/1983 | Holker ................... C08G 18/10 428/423.1 |
| 4,984,376 | A | | 1/1991 | Walter et al. |
| 4,988,740 | A | | 1/1991 | Walter et al. |
| 5,614,588 | A | * | 3/1997 | Steenblock ................ C08J 5/18 525/66 |

(Continued)

FOREIGN PATENT DOCUMENTS

| CN | 1181098 A | 5/1998 |
| CN | 101311208 A | 11/2008 |

(Continued)

OTHER PUBLICATIONS

Bralla, James G. Handbook of Manufacturing Processes—How Products, Components and Materials are Made, Dec. 2007, Industrial Press, p. 187.*
ScienceDirect, "Polymer Alloy," 2019, ScienceDirect, pp. 1-12 (Year: 2019).*
International Search Report (PCT/ISA/210) dated Sep. 12, 2013, by the European Patent Office as the International Searching Authority for International Application No. PCT/FR2013/051321.

(Continued)

Primary Examiner — Maria V Ewald
Assistant Examiner — Ethan Weydemeyer
(74) Attorney, Agent, or Firm — Buchanan Ingersoll & Rooney P.C.

(57) ABSTRACT

The present invention relates to the use of thermoplastic starch in the manufacture of an adhesive and ultrathin waterproof-breathable film, said thermoplastic starch being provided in the form of an alloy with hydrophilic TPE comprising at least 10% by weight, preferably at least 20% by weight, preferably at least 30% by weight, preferably at least 40% by weight, preferably at least 50% by weight, of polyethylene glycol (PEG), with regard to the weight of the TPE.
This film can be used in a textile product in the medical field, hygiene, luggage, the clothing industry, the garment industry, domestic or household equipment, furniture, fitted carpets, the automobile industry, industry, in particular industrial filtration, agriculture and/or the construction industry.

16 Claims, No Drawings

(56) References Cited

U.S. PATENT DOCUMENTS

| | | |
|---|---|---|
| 5,800,928 A | 9/1998 | Fischer et al. |
| 5,908,690 A | 6/1999 | Schultze et al. |
| 6,096,809 A * | 8/2000 | Lorcks ............... C08L 3/02 |
| | | 523/128 |
| 6,191,221 B1 | 2/2001 | McAmish et al. |
| 2004/0063865 A1* | 4/2004 | Mariani ............ A61L 15/42 |
| | | 525/403 |
| 2004/0242774 A1 | 12/2004 | Fujimura et al. |
| 2005/0165210 A1 | 7/2005 | Malet et al. |
| 2009/0092816 A1 | 4/2009 | Flat et al. |
| 2011/0311743 A1 | 12/2011 | Kaneko et al. |
| 2012/0315454 A1 | 12/2012 | Wang et al. |

FOREIGN PATENT DOCUMENTS

| | | | |
|---|---|---|---|
| EP | 402 883 A2 | 12/1990 | |
| EP | 405 227 A2 | 1/1991 | |
| EP | 0476963 B1 * | 5/1996 | ............. A61C 13/00 |
| EP | 1 482 011 A1 | 12/2004 | |
| FR | 2 846 332 A1 | 4/2004 | |
| JP | 2004-346274 A | 12/2004 | |
| JP | 2004-352794 A | 12/2004 | |
| WO | WO 9801493 A1 * | 1/1998 | ......... C08G 18/4277 |
| WO | WO 2011/080623 A2 | 7/2011 | |

OTHER PUBLICATIONS

Official Action dated Apr. 6, 2021 in Chinese Patent Application No. 201911045563.1, National Intellectual Property Administration, P.R. China, Beijing, CN, 25 pages including English-language translation.

Office Action (The Second Office Action) dated Jan. 7, 2022, by the State Intellectual Property Office of the People's Republic of China in corresponding Chinese Patent Application No. 201911045563.1, and an English Translation of the Office Action. (19 pages).

* cited by examiner

USE OF AN ALLOY OF THERMOPLASTIC STARCH AND TPE IN THE MANUFACTURE OF AN ADHESIVE ULTRATHIN WATERPROOF-BREATHABLE FILM

TECHNICAL FIELD

The technical field to which the invention relates is that of waterproof-breathable films used in the textile field. Such a waterproof-breathable film is simultaneously permeable to water vapor and impermeable to water.

STATE OF THE ART

There are many technical fields which require textiles having improved and prolonged waterproof-breathable properties. Mention may in particular be made of the medical field, medical equipment, surgical gowns, carpets, mattresses, dressings, protective clothing; agriculture, agricultural films; wrapping, packaging; military equipment, maritime equipment, in particular marine coverings; transportation, aeronautics, the automobile industry; sport; leisure activities; computing, electronics, furniture; decoration; equipment for babies or for children; exterior equipment; the insulation of the walls of a building, roof-decking films.

A waterproof-breathable film is a flexible film, the role of which, on the one hand, is to prevent external elements, such as dust, pollen, sand, rain and snow, from infiltrating through the textile and, on the other hand, to prevent the moisture produced, for example by human activity, from accumulating in the textile. This film makes possible the discharge of the water vapor from the textile. The use of a waterproof-breathable film makes it possible to have a textile which breathes and which is thus healthy for those who use it.

The permeability to water vapor is evaluated using the parameter MVTR (Moisture Vapor Transmission Rate). In particular, it is desirable for a waterproof-breathable film to exhibit an MVTR value, measured by the standard ASTM E96, of at least 70 $g/m^2$ for 24 hours at 23° C. for a relative humidity of 50% and a film thickness of 25 µm. For the abovementioned applications, it is desirable in particular for the minimum permeability to be at least 350 $g/m^2$ under the same measurement conditions, when the film used adheres to the surface of a textile. It is also desirable for the adhesion of the film to the textile not to detrimentally change as the textile is used, in particular when the amount of water vapor to be discharged is greater in the case of a significant increase in the temperature. In other words, a search is under way for a waterproof-breathable textile product which is not easily decomposed by prolonged exposure to moisture. Furthermore, the enhancement in the waterproof-breathable properties and the adhesion of the film to the textile must not take place to the detriment of the flexibility or of the fineness (thickness) of the textile. The search is thus under way for a waterproof-breathable textile product (hereinafter treated textile or laminated product) which exhibits a high permeability to water vapor and a good lifetime, in order to guarantee the continuity thereof, while having the appearance of a "bare" textile without specific treatment.

The known films are manufactured from synthetic polymers. In point of fact, synthetic polymers are manufactured from non-renewable starting materials. Attempts are being made to limit their amount in the manufacture of a waterproof-breathable film. The aim is thus to find a film which is obtained at least partially from natural (or bioresourced) starting materials and which exhibits a permeability at least as good as that of a film obtained from synthetic polymers. In particular, the aim is to find a film which is obtained at least partially from natural starting materials and which satisfies the permeability requirements indicated above.

Finally, the films of the prior art are obtained by shaping a blend comprising different polymers known for their waterproof-breathable properties. The shaping can be carried out according to any known extrusion process, such as flat die extrusion calendering, extrusion-acrylic resin coating or extrusion/blow molding. Generally, despite a high heating power, it is not possible to obtain films with a thickness of less than 25 µm. The aim is thus to find a waterproof-breathable film which can be easily manufactured with conventional devices for the manufacture of thermoplastic films and at a heating or extrusion temperature within the range from 100° C. to 300° C., preferably within the range from 150° C. to 250° C.

SUMMARY OF THE INVENTION

The present invention therefore relates to the use of thermoplastic starch in the manufacture of an adhesive and ultrathin waterproof-breathable film, adhesive in particular on the surface of at least one textile material, said thermoplastic starch being provided in the form of an alloy with hydrophilic TPE comprising at least 10% by weight, preferably at least 20% by weight, preferably at least 30% by weight, preferably at least 40% by weight, preferably at least 50% by weight, of polyethylene glycol (PEG), with regard to the weight of the TPE.

The thermoplastic elastomer polymers (referred to as TPEs in the present description) which can be used in the alloy according to the invention can be chosen from (a) copolymers comprising polyester blocks and polyether blocks (hereinafter COPEs or copolyetheresters), (b) copolymers comprising polyurethane blocks and polyether or polyester blocks (also known as TPUs, abbreviation of thermoplastic polyurethanes) and (c) copolymers comprising polyamide blocks and polyether blocks (also known as PEBAs according to the IUPAC).

Hydrophilic TPE is understood to mean a TPE comprising at least 10% by weight, preferably at least 20% by weight, preferably at least 30% by weight, preferably at least 40% by weight, preferably at least 50% by weight, of polyethylene glycol (PEG), with regard to the weight of the TPE.

(a) Regarding the COPEs or copolyetheresters, these are copolymers comprising polyester blocks and polyether blocks. They are composed of soft polyether blocks resulting from polyetherdiols and of rigid polyester blocks which result from the reaction of at least one dicarboxylic acid with at least one chain-lengthening short diol unit. The polyester blocks and the polyether blocks are connected via ester bonds resulting from the reaction of the acid functional groups of the dicarboxylic acid with the OH functional groups of the polyetherdiol. The linking of the polyethers and diacids forms the soft blocks while the linking of the glycol or butanediol with the diacids forms the rigid blocks of the copolyetherester. The chain-lengthening short diol can be chosen from the group consisting of neopentyl glycol, cyclohexanedimethanol and aliphatic glycols of formula $HO(CH_2)_nOH$ in which n is an integer having a value from 2 to 10.

Advantageously, the diacids are aromatic dicarboxylic acids having from 8 to 14 carbon atoms. Up to 50 mol % of the aromatic dicarboxylic acid can be replaced with at least one other aromatic dicarboxylic acid having from 8 to 14 carbon atoms and/or up to 20 mol % can be replaced with an aliphatic dicarboxylic acid having from 2 to 14 carbon atoms.

Mention may be made, as example of aromatic dicarboxylic acids, of terephthalic acid, isophthalic acid, bibenzoic acid, naphthalenedicarboxylic acid, 4,4'-diphenylenedicarboxylic acid, bis(p-carboxyphenyl)methane, ethylenebis(p-benzoic acid), 1,4-tetramethylenebis(p-oxybenzoic acid), ethylenebis(p-oxybenzoic acid) or 1,3-trimethylenebis(p-oxybenzoic acid).

Mention may be made, as example of glycols, of ethylene glycol, 1,3-trimethylene glycol, 1,4-tetramethylene glycol, 1,6-hexamethylene glycol, 1,3-propylene glycol, 1,8-octamethylene glycol, 1,10-decamethylene glycol and 1,4-cyclohexanedimethanol. The copolymers comprising polyester blocks and polyether blocks are, for example, copolymers having polyether units derived from polyetherdiols, such as polyethylene glycol (PEG), polypropylene glycol (PPG), polytrimethylene glycol (PO3G) or polytetramethylene glycol (PTMG), dicarboxylic acid units, such as terephthalic acid, and glycol (ethanediol) or 1,4-butanediol units. Such copolyetheresters are described in the patents EP 402 883 and EP 405 227. These polyetheresters are thermoplastic elastomers. They can comprise plasticizers.

(b) As regards the TPUs, mention may be made of the polyetherurethanes which result from the condensation of soft polyether blocks, which are polyetherdiols, and of rigid polyurethane blocks resulting from the reaction of at least one diisocyanate, which can be chosen from aromatic diisocyanates (e.g.: MDI, TDI) and aliphatic diisocyanates (e.g.: HDI or hexamethylene diisocyanate), with at least one short diol. The chain-lengthening short diol can be chosen from the glycols mentioned above in the description of the copolyetheresters. The polyurethane blocks and the polyether blocks are connected via bonds resulting from the reaction of the isocyanate functional groups with the OH functional groups of the polyetherdiol.

Mention may also be made of the polyesterurethanes which result from the condensation of soft polyester blocks, which are polyesterdiols, and of rigid polyurethane blocks resulting from the reaction of at least one diisocyanate with at least one short diol. The polyesterdiols result from the condensation of dicarboxylic acids, advantageously chosen from aliphatic dicarboxylic acids having from 2 to 14 carbon atoms, and of glycols which are chain-lengthening short diols chosen from the glycols mentioned above in the description of the copolyetheresters. They can comprise plasticizers.

(c) As regards the "PEBAs", or copolymers comprising polyether blocks and polyamide blocks, they result from the polycondensation of polyamide blocks comprising reactive ends with polyether blocks comprising reactive ends, such as, inter alia:
1) polyamide blocks comprising diamine chain ends with polyoxyalkylene blocks comprising dicarboxyl chain ends;
2) polyamide blocks comprising dicarboxyl chain ends with polyoxyalkylene blocks comprising diamine chain ends, which are obtained by cyanoethylation and hydrogenation of aliphatic α,ω-dihydroxylated polyoxyalkylene blocks, known as polyetherdiols;
3) polyamide blocks comprising dicarboxyl chain ends with polyetherdiols, the products obtained being, in this specific case, polyetheresteramides.

The polyamide blocks comprising dicarboxyl chain ends originate, for example, from the condensation of precursors of polyamides in the presence of a chain-limiting dicarboxylic acid. The polyamide blocks comprising diamine chain ends originate, for example, from the condensation of precursors of polyamides in the presence of a chain-limiting diamine.

The number-average molar mass Mn of the polyamide blocks is between 400 and 20 000 g/mol, preferably between 500 and 10 000 g/mol.

The polymers comprising polyamide blocks and polyether blocks can also comprise randomly distributed units.

Use may be advantageously made of three types of polyamide blocks.

According to a first type, the polyamide blocks originate from the condensation of a dicarboxylic acid, in particular those having from 4 to 20 carbon atoms, preferably those having from 6 to 18 carbon atoms, and of an aliphatic or aromatic diamine, in particular those having from 2 to 20 carbon atoms, preferably those having from 6 to 14 carbon atoms.

Mention may be made, as examples of dicarboxylic acids, of 1,4-cyclohexanedicarboxylic acid, butanedioic, adipic, azelaic, suberic, sebacic, dodecane-dicarboxylic and octadecanedicarboxylic acids and terephthalic and isophthalic acids, but also dimerized fatty acids.

Mention may be made, as examples of diamines, of tetramethylenediamine, hexamethylenediamine, 1,10-decamethylenediamine, dodecamethylenediamine, trimethylhexamethylenediamine, the isomers of bis(4-aminocyclohexyl)methane (BACM), bis(3-methyl-4-aminocyclohexyl)methane (BMACM), and 2,2-bis(3-methyl-4-aminocyclohexyl)propane (BMACP), and di(para-aminocyclohexyl)methane (PACM), and isophoronediamine (IPDA), 2,6-bis(aminomethyl)norbornane (BAMN) and piperazine (Pip).

The following blocks advantageously exist: PA4.12, PA4.14, PA4.18, PA6.10, PA6.12, PA6.14, PA6.18, PA9.12, PA10.10, PA10.12, PA10.14 and PA10.18, the first figure indicating the number of carbon atoms of the diamine and the second figure indicating the number of carbon atoms of the dicarboxylic acid.

According to a second type, the polyamide blocks result from the condensation of one or more α,ω-aminocarboxylic acids and/or of one or more lactams having from 6 to 12 carbon atoms in the presence of a dicarboxylic acid having from 4 to 12 carbon atoms or of a diamine. Mention may be made, as examples of lactams, of caprolactam, oenantholactam and lauryllactam. Mention may be made, as examples of α,ω-aminocarboxylic acid, of aminocaproic, 7-aminoheptanoic, 11-aminoundecanoic and 12-aminododecanoic acids.

Advantageously, the polyamide blocks of the second type are of polyamide 11, of polyamide 12 or of polyamide 6.

According to a third type, the polyamide blocks result from the condensation of at least one α,ω-aminocarboxylic acid (or one lactam), at least one diamine and at least one dicarboxylic acid.

In this case, the polyamide PA blocks are prepared by polycondensation:
of the linear aliphatic or aromatic diamine or diamines having X carbon atoms;
of the dicarboxylic acid or acids having Y carbon atoms; and
of the comonomer or comonomers {Z} chosen from the lactams and the α,ω-aminocarboxylic acids having Z carbon atoms and the equimolar mixtures of at least one diamine having X1 carbon atoms and of at least one dicarboxylic acid having Y1 carbon atoms, (X1, Y1) being different from (X, Y), said comonomer or comonomers {Z} being introduced in a proportion by weight ranging up to 50%, preferably up to 20% and more advantageously still up to 10%, with respect to the combined polyamide precursor monomers;

in the presence of a chain-limiting agent chosen from dicarboxylic acids.

Use is advantageously made, as chain-limiting agent, of the dicarboxylic acid having Y carbon atoms, which is introduced in excess with respect to the stoichiometry of the diamine or diamines.

According to an alternative form of this third type, the polyamide blocks result from the condensation of at least two α,ω-aminocarboxylic acids or of at least two lactams having from 6 to 12 carbon atoms or of a lactam and of an aminocarboxylic acid not having the same number of carbon atoms, in the optional presence of a chain-limiting agent. Mention may be made, as examples of aliphatic α,ω-aminocarboxylic acid, of aminocaproic, 7-aminoheptanoic, 11-aminoundecanoic and 12-aminododecanoic acids. Mention may be made, as examples of a lactam, of caprolactam, oenantholactam and lauryllactam. Mention may be made, as examples of aliphatic diamines, of hexamethylenediamine, dodecamethylenediamine and trimethylhexamethylenediamine. Mention may be made, as example of cycloaliphatic diacids, of 1,4-cyclohexanedicarboxylic acid. Mention may be made, as examples of aliphatic diacids, of butanedioic, adipic, azelaic, suberic, sebacic and dodecanedicarboxylic acids, dimerized fatty acids (these dimerized fatty acids preferably have a dimer content of at least 98%; preferably, they are hydrogenated; they are sold under the Pripol® trade name by Uniqema or under the Empol® trade name by Henkel) and polyoxyalkylene-α,ω-diacids. Mention may be made, as examples of aromatic diacids, of terephthalic (T) and isophthalic (I) acids. Mention may be made, as examples of cycloaliphatic diamines, of the isomers of bis(4-aminocyclohexyl)methane (BACM), bis(3-methyl-4-aminocyclohexyl)methane (BMACM), and 2,2-bis(3-methyl-4-aminocyclohexyl)propane (BMACP), and di(para-aminocyclohexyl)methane (PACM). The other diamines commonly used can be isophoronediamine (IPDA), 2,6-bis(aminomethyl)norbornane (BAMN) and piperazine.

Mention may be made, as examples of polyamide blocks of the third type, of the following:

6.6/6 in which 6.6 denotes hexamethylenediamine units condensed with adipic acid and 6 denotes units resulting from the condensation of caprolactam.

6.6/6.10/11/12 in which 6.6 denotes hexamethylenediamine condensed with adipic acid, 6.10 denotes hexamethylenediamine condensed with sebacic acid, 11 denotes units resulting from the condensation of aminoundecanoic acid and 12 denotes units resulting from the condensation of lauryllactam.

Preferably, the polymer comprises from 1% to 80% by weight of polyether blocks and from 20% to 99% by weight of polyamide blocks, preferably from 4% to 80% by weight of polyether blocks and from 20% to 96% by weight of polyamide blocks and more preferably from 30% to 60% by weight of polyether blocks and from 40% to 70% by weight of polyamide blocks. The mass Mn of the polyether blocks is between 100 and 6000 g/mol and preferably between 200 and 3000 g/mol.

The polyether blocks consist of alkylene oxide units. These units can, for example, be ethylene oxide units, propylene oxide units or tetrahydrofuran units (which results in the polytetramethylene glycol sequences). Use is thus made of PEG (polyethylene glycol) blocks, that is to say those consisting of ethylene oxide units, PPG (polypropylene glycol) blocks, that is to say those consisting of propylene oxide units, PO3G (polytrimethylene glycol) blocks, that is to say those consisting of polytrimethylene ether glycol units (such copolymers with polytrimethylene ether blocks are described in the document U.S. Pat. No. 6,590,065), and PTMG blocks, that is to say those consisting of tetramethylene glycol units, also known as polytetrahydrofuran blocks. The PEBA copolymers can comprise several types of polyethers in their chain, it being possible for the copolyethers to be block or random copolyethers. The permeability to water vapor of the PEBA copolymer increases with the amount of polyether blocks and varies as a function of the nature of these blocks. It is preferable to use a polyethylene glycol polyether block which makes it possible to obtain a PEBA exhibiting good permeability.

The polyether blocks can also consist of ethoxylated primary amines. Mention may be made, as examples of ethoxylated primary amines, of the products of formula:

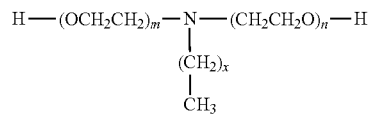

in which m and n are between 1 and 20 and x is between 8 and 18. These products are commercially available under the Noramox® trade name from CECA and under the Genamin® trade name from Clariant.

The soft polyether blocks can comprise polyoxyalkylene blocks comprising NH$_2$ chain ends, it being possible for such blocks to be obtained by cyanoacetylation of aliphatic α,ω-dihydroxylated polyoxyalkylene blocks, known as polyetherdiols. More particularly, use may be made of Jeffamines (for example, Jeffamine® D400, D2000, ED 2003 or XTJ 542, commercial products from Huntsman, also described in the documents of patents JP 2004346274, JP 2004352794 and EP 1 482 011).

The polyetherdiol blocks are either used as is and copolycondensed with polyamide blocks comprising carboxyl ends or they are aminated in order to be converted into polyetherdiamines and condensed with polyamide blocks comprising carboxyl ends. The general method for the two-stage preparation of PEBA copolymers having ester bonds between the PA blocks and the PE blocks is known and is described, for example, in the French patent FR 2 846 332. The general method for the preparation of the PEBA copolymers of the invention having amide bonds between the PA blocks and the PE blocks is known and described, for example, in the European patent EP 1 482 011. Polyether blocks may also be mixed with polyamide precursors and a chain-limiting diacid in order to prepare polymers comprising polyamide blocks and polyether blocks having randomly distributed units (one-stage process).

Of course, the designation PEBA in the present description of the invention relates equally well to the PEBAX® products sold by Arkema, to the Vestamid® products sold by Evonik®, to the Grilamid® products sold by EMS, to the Kellaflex® products sold by DSM or to any other PEBA from other suppliers.

Advantageously, the PEBA copolymers have PA blocks of PA6, of PA11, of PA12, of PA6.12, of PA6.6/6, of PA10.10 and/or of PA6.14, preferably PA11 and/or PA12 blocks; and PE blocks of PTMG, of PPG and/or of PO3G. The PEBAs based on PE blocks consisting predominantly of PEG are to be ranked in the range of the hydrophilic PEBAs. The PEBAs based on PE blocks consisting predominantly of a PTMG are to be ranked in the range of the hydrophobic PEBAs.

Advantageously, said PEBA used in the composition according to the invention is obtained, at least partially, from bioresourced starting materials. Starting materials of renewable origin or bioresourced starting materials is understood to mean substances which comprise bioresourced carbon or carbon of renewable origin. Specifically, unlike the substances resulting from fossil materials, the substances composed of renewable starting materials comprise $^{14}C$. The "content of carbon of renewable origin" or "content of bioresourced carbon" is determined by application of the standards ASTM D 6866 (ASTM D 6866-06) and ASTM D 7026 (ASTM D 7026-04). By way of example, the PEBAs based on polyamide 11 originate at least in part from bioresourced starting materials and exhibit a content of bioresourced carbon of at least 1%, which corresponds to a $^{12}C/^{14}C$ isotopic ratio of at least $1.2 \times 10^{-14}$. Preferably, the PEBAs according to the invention comprise at least 50% by weight of bioresourced carbon with respect to the total weight of carbon, which Corresponds to a $^{12}C/^{14}C$ isotopic ratio of a least $0.6 \times 10^{-12}$. This content is advantageously higher, in particular up to 100%, which corresponds to a $^{12}C/^{14}C$ isotopic ratio of $1.2 \times 10^{-12}$, in the case of PEBAs comprising PA11 blocks and PE blocks comprising PO3G, PTMG and/or PPG resulting from starting materials of renewable origin.

According to an advantageous embodiment of the invention, the hydrophilic TPE comprises:
from 1% to 100%, preferably from 50% to 100%, of copolymer comprising polyurethane blocks and PEG blocks (TPUs) and
from 99% to 0%, preferably from 50% to 0%, of at least one other hydrophilic TPE chosen from copolymers comprising polyamide blocks and PEG blocks (PEBAs), copolymers comprising polyester blocks and PEG blocks (COPEs) and their blends, with regard to the weight of the hydrophilic TPE.

According to an advantageous embodiment, the alloy used in the present invention comprises at least one of these TPEs, optionally blended with at least one functionalized polyolefin. According to a specific embodiment, the alloy, and subsequently the film, according to the invention additionally comprises a functionalized polyolefin, that is to say a polyolefin comprising a grafting by a monomer chosen from the group consisting of unsaturated carboxylic acids, unsaturated carboxylic anhydrides, vinyl monomers, acrylic monomers and a mixture of these. Preferably, the (functionalized) polyolefin is chosen from the group consisting of ethylene/acrylic ester copolymers, ethylene/acrylic ester/maleic anhydride copolymers and ethylene/acrylic ester/glycidyl methacrylate copolymers, these copolymers being grafted/functionalized as described above. Advantageously, the functionalized polyolefin used is chosen from these described and claimed in patent application FR2959939A1.

Thermoplastic starch, hereinafter known as "TPS", is understood to mean native starch converted into proces sable material by plasticizing in the presence of a small amount of water. The plasticized starch, known as "thermoplastic starch", is obtained in particular with a nonvolatile plasticizer, such as glycerol. This material has many advantages, such as its cost, its biodegradable nature and its origin, resulting from abundant renewable resources. It can be processed with conventional devices of plastics technology. Plasticized starch unfortunately has a few significant limits, such as its high sensitivity to water, limited mechanical properties and adhesive properties, in comparison with a conventional thermoplastic, and a very lengthy aging, after the processing thereof, before stabilization of its properties (phenomena of retrogradation or densification). Its use in the form of an alloy according to the invention makes it possible to overcome these disadvantages by virtue of the formulation of starch with other compounds and the use of the process according to the invention. According to a preferred embodiment, the percentage of thermoplastic starch in the alloy used represents from 10% to 90% of the weight of the alloy, preferably from 30% to 80%, more preferably from 40% to 70% and more preferably from 50% to 70% of the weight of the alloy.

Any type of starch can be used in the invention. It can be corn, potato, wheat, tapioca or pea starch. The starch can be modified by grafting chemical groups. It can be employed in the following different forms:
native (unmodified) starch: the starch grains are the site of the semicrystalline organization of the two constituent polymers, which are amylose and amylopectin. The degree of polymerization and the proportion of amylose vary according to the botanical origin of the starch.
gelatinized starch: during heating in the vicinity of 80° C. in an aqueous medium, the starch hydrates and swells. A portion of the amylose and then of the amylopectin passes into solution (starching). The suspension then becomes viscous and the starch becomes easier to hydrolyze.
gelled starch—retrograded starch: when the temperature of the aqueous solution decreases, the system becomes gelled and then reorganized into a semicrystalline structure (retrogradation). These reorganized molecules are formed of amylose, of amylopectin and of mixed amylose/amylopectin crystals.
destructured starch, in which form the amylose and amylopectin polymers are dispersed.

In addition to the use of starch, which is a natural material, the use of PEBA polymers prepared from at least partially bioresourced polyamide and/or polyether blocks makes it possible to further increase the amount of natural materials in the film according to the invention.

The alloy according to the invention can be prepared by any method which makes it possible to obtain an intimate or homogeneous blend comprising the thermoplastic starch and said at least one hydrophilic TPE according to the invention, and optionally (a) additive(s) and/or (a) compatibilizing agent(s), such as melt compounding, extrusion, compacting or even roll mill.

More particularly, the alloy according to the invention is prepared by melt blending all the ingredients (starch, plasticizer, water, TPE and optional compatibilizer(s) and additive(s)) in a "direct" process. It is also possible to prepare the alloy according to a two-stage process, the first stage consisting in preparing a concentrated blend of the starch, plasticizer and water, in order to form a TPS matrix, and then a second stage consisting in diluting the TPS by blending with the TPE matrix.

Use is advantageously made of the normal devices for blending and kneading of the thermoplastics industry, such as extruders, extruders of twin-screw type, in particular self-cleaning engaging corotating twin-screw extruders, and kneaders, for example co-kneaders of Buss brand or internal mixers. In this process, the ingredients can either be dry blended and introduced into the feed hopper or else the hydrophilic TPE can be introduced via a side feed into the TPS or into a pre-molten starch+plasticizer+water blend.

It is recommended that the preparation of the alloys of the invention (the compounding) and the processing thereof be carried out under the mildest possible conditions in terms of temperature and shear rate. In order to do this, reference may be made to the reference: O. Schacker, Plastics Additives and Compounding, April 2002, pages 28-33.

The alloys according to the invention exhibit an excellent performance/cost ratio for obtaining novel waterproof-breathable materials. Difference performances are obtained according to the TPE/TPS ratios used. In order to improve the compatibility of the blend, the addition of compatibilizers. The latter is preferred in the present invention.

In contrast to the multilayers manufactured by coextrusion of plasticized starch and thermoplastic polymers, the alloys according to the invention do not have problems of interfacial instabilities due in particular to the differences in chemical behavior and rheology of the materials brought together in the die. Furthermore, the alloys according to the invention do not have the problems of reduction in the hydrophilicity properties generally encountered with biocomposites. This is because the introduction of lignocellulose fibers into biopolyesters or into a plasticized starch matrix results in a reduction in the hydrophilicity properties related to the presence of the more hydrophobic fibers.

Another subject matter of the present invention is an adhesive and ultrathin waterproof-breathable film, characterized in that it comprises an alloy of thermoplastic starch and of hydrophilic TPE, said TPE comprising at least 10% by weight, preferably at least 20% by weight, preferably at least 30% by weight, preferably at least 40% by weight, preferably at least 50% by weight, of polyethylene glycol (PEG), with regard to the weight of the TPE. Advantageously, the percentage of thermoplastic starch represents from 10% to 90% and the percentage of hydrophilic TPE represents from 90% to 10% of the weight of the alloy in the film.

According to one embodiment, the waterproof-breathable film of the invention is prepared directly after the manufacture of the alloy according to the following stages: preparing a blend of the TPE(s) with thermoplastic starch (or starch, water and a plasticizer) and then melting the blend by heating to a temperature greater than the melting point of the polymer(s) and than the melting point of the starch, so as to form a homogeneous blend in the form of an alloy. The thermoplastic alloy obtained is then drawn in order to form a film. The heating of the TPE(s) can be carried out separately from the stage of heating the starch, the molten TPE(s) and the starch being subsequently blended.

According to a preferred embodiment of the process of the invention, the following stages are carried out:
a) making available a blend of starch, of plasticizer and of water;
b) making available hydrophilic TPE as defined above;
c) extruding the blend of stage a) and then adding the TPE from stage b) to the blend at the end of extrusion, generally at a temperature greater than the melting point of the polymer(s) of stage a) and than the melting point of the starch;
d) drawing the blend in order to form a film.

Preferably, stage c) is carried out at a temperature within the range from 100° C. to 300° C., preferably from 150° C. to 250° C.

According to one embodiment, the stage of drawing the blend is carried out by extrusion/blow molding. According to an alternative embodiment, the stage of drawing the blend is carried out by cast film extrusion.

The process of the invention makes it possible to maintain the TPE at a sufficiently high temperature, greater than the melting point of the hydrophilic TPE, in order to obtain ultrathin films, that is to say with a thickness of less than or equal to 25 µm, while limiting the risk of degradation of the starch and of the TPE(s). Preferably, the heating or extrusion temperature before drawing the film is within the range from 100° C. to 300° C., preferably from 150° C. to 250° C.

Advantageously, the waterproof-breathable film according to the invention has a thickness of less than or equal to 25 µm, preferably within the range from 5 to 25 µm.

Another subject matter of the invention is a laminated product (hereinafter laminate) comprising at least one textile material and at least one waterproof-breathable film according to the invention, said film adhering to at least one surface of the textile material with a peel strength within the range from 0.5 to 50 N, preferably from 0.5 to 10 N.

Advantageously, the film according to the invention is in particular applied to a textile material by any known process, preferably without using adhesive between the film and the textile. Mention may be made, by way of example, of the extrusion-coating of a film of the alloy over the textile, or the hot pressing (thermal lamination or lamination with an adhesive) of the film over a textile or between two textiles, at a temperature sufficient for the film to become impregnated and to trap the fibers of the textile. According to an alternative embodiment or an embodiment in combination with the preceding one(s), mention may also be made of adhesive bonding using an adhesive joint, preferably a water-based adhesive joint, that is to say comprising less than 5% by weight of solvent, with regard to the adhesive joint composition. It turns out that the films using an alloy according to the invention exhibit better adhesion to textiles, even without adhesive, in comparison with the existing waterproof-breathable films.

According to a preferred embodiment, the process for processing the alloys used to produce waterproof-breathable materials and laminates according to the invention is characterized in that the compositions are applied on a cast extrusion or blown extrusion line, in the molten state, at a temperature of at least 120° C., in order to form a film having a minimum thickness of 5 µm. This type of process also makes it possible to optimize the transformation conditions in order to prepare films which are as thin as possible, advantageously between 5 and 50 µm in thickness, preferably with a thickness within the range from 5 to 25 µm, resulting from in-line blendings of the materials according to the invention diluted in varied proportions and without having microperforations. By varying the temperature and drawing-rate parameters of the line, it is possible to control the thickness of the films. According to another preferred embodiment, the process of processing the compositions which are used for producing waterproof-breathable films and laminates according to the invention is characterized in that the compositions are applied in the molten state on an extrusion-coating line to a textile or on an extrusion-lamination line between two textiles, such as a nonwoven made of fibrous material and/or any other textile material, including paper, in order to form a complex with a grammage of at least 5 g/m². According to a known process, the film according to the invention is extruded and then coated in the molten state onto the textile. Preferably, the film exhibits a thickness of between 5 and 50 µm and preferably between approximately 5 and 10 µm. Advantageously, in the context of an application by extrusion-coating, from 10 to 50 g/m² of thermoplastic film are deposited on the textile.

In the present description of the invention:
- "textile material" or "textile" is understood to mean any material produced from fibers or filaments and any material, including paper and board, forming a porous membrane characterized by a length/thickness ratio of at least 300;
- "fiber" is understood to mean any synthetic or natural material characterized by a length/diameter ratio of at least 300;
- "filament" is understood to mean any fiber of infinite length.

The textiles include in particular mats of fibers (dressings, filters or felt), rovings (dressings), yarns (to be sewn, to be knitted or to be woven), items of knitwear (straight, circular or fully-fashioned), woven products (traditional, jacquard, multiple, two-sides, multi-axial, 2D and semi-3D) and many others. According to a preferred embodiment of the invention, said at least one textile material is provided in the form of a porous membrane, of a woven textile or of a nonwoven textile.

Advantageously, said at least one textile material comprises synthetic fibers, in particular synthetic fibers obtained from bioresourced starting materials, natural fibers, artificial fibers manufactured from natural starting materials, mineral fibers and/or metal fibers.

Advantageously, said textile comprises synthetic fibers obtained from bioresourced starting materials, such as polyamide fibers, in particular polyamide 11 fibers. Advantageously, said textile additionally comprises natural fibers, such as cotton, wool and/or silk, artificial fibers manufactured from natural starting materials, or mineral fibers, such as carbon fibers, glass fibers, silica fibers and/or magnesium fibers.

Preferably, said textile material, whatever its form, is manufactured from at least one of the following materials: polypropylene, polyether, polyester and/or cotton.

The textile is chosen in particular from fabrics or textile surfaces, such as woven, knitted, nonwoven or mat surfaces. These articles can, for example, be fitted carpets, carpets, furniture coverings, surface coverings, sofas, curtains, bedding, mattresses and pillows, clothing and medical textile materials.

The textile according to the invention advantageously constitutes a felt, a filter, a film, a gauze, a cloth, a dressing, a layer, a fabric, an item of knitwear, an item of clothing, a garment, an item of bedding, an item of furniture, a curtain, a compartment covering, a functional technical textile, a geotextile and/or an agrotextile.

Said textile is advantageously used in the medical field, hygiene, luggage, the clothing industry, the garment industry, domestic or household equipment, furniture, fitted carpets, the automobile industry, industry, in particular industrial filtration, agriculture and/or the construction industry.

Such a film exhibits both good durability and improved permeability to water vapor. The film retains over time its property of barrier to the external elements which might infiltrate into the textile. The improvement in the permeability of the film to water vapor promotes ventilation through the textile.

EXAMPLES

Waterproof-breathable films were prepared from blends comprising various proportions of a TPU, of a copolyether-block-amide PEBA, of a functionalized polyolefin and of thermoplastic starch. The TPU used in the examples below is a Desmopan DP9370A grade sold by Bayer. The TPE used in the examples below belongs to the range of the hydrophilic PEBAs sold by Arkema and in particular those for which the polyether block derives from polyethylene glycol. In this instance, it is Pebax® MV3000. The functionalized polyolefin is Lotryl® 20MA08, which is a copolymer of ethylene with n-methyl acrylate at an acrylate content by weight of 20% having an MFI of 8 g/10 min (190° C./2.16 kg). The starch used is modified starch (TPS 3947) sold by Roquette.

The waterproofness-breathability (or MVTR) of the various films having the compositions A to I is measured according to the standard ASTM E96, BW method, 38° C./50% Relative Humidity, with respect to a 25 µm film.

The adhesion of the substrates is directly related to the peel strength values. A peel test (according to the standard ISO 11339) was carried out on the laminates of each of tests A to I, on a strip with a width of 15 mm of laminate, primed and then drawn at a rate of 200 mm/minute. The peel tests are preferably carried out within a period of time of between 2 hours and 48 hours after the manufacture of a laminate comprising an adhesive film of 25 µm, by extrusion-coating, on a nonwoven polypropylene textile.

The compositions of the various blends prepared are summarized in table 1 below. Examples A-E are comparative. Examples F to I are according to the invention.

TABLE 1

|  | Test | % by weight of TPU (PEG base) | % by weight of TPE (PEG-based PEBAX) | % by weight of FPO | % by weight of thermoplastic starch (TPS) | Thickness of the film (µm) | Waterproofness-breathability MVTR (g/m²/day) standardized at 25 µm | Adhesion to the textile: Peel strength (N/15 mm) |
|---|---|---|---|---|---|---|---|---|
| Comparative examples | A | 100 | 0 | 0 | 0 | 25 | 420 | 0.5 |
|  | B | 70 | 0 | 30 | 0 | 20 | 210 | 0.8 |
|  | C | 50 | 0 | 50 | 0 | 20 | 105 | 1.5 |
|  | D | 70 | 30 | 0 | 0 | 30 | 560 | 0.6 |
|  | E | 25 | 25 | 50 | 0 | 20 | 140 | 1.7 |
| Examples according to the invention | F | 50 | 0 | 0 | 50 | 25 | 1050 | 0.8 |
|  | G | 60 | 0 | 0 | 40 | 25 | 770 | 0.8 |
|  | H | 70 | 0 | 0 | 30 | 25 | 630 | 0.7 |
|  | I | 40 | 0 | 20 | 40 | 20 | 525 | 1.0 |
|  | J | 20 | 20 | 20 | 40 | 20 | 560 | 1.1 |

The invention claimed is:

1. An adhesive waterproof-breathable film comprising an alloy of thermoplastic starch and of hydrophilic thermoplastic elastomer (TPE), said hydrophilic TPE comprising at least 50% by weight of polyethylene glycol (PEG), with regard to total weight of said hydrophilic TPE;
   wherein said hydrophilic TPE comprises:
      a copolymer comprising polyurethane blocks and PEG blocks (TPUs); and
      at least one other hydrophilic TPE chosen from the group consisting of copolymers comprising polyamide blocks and PEG blocks (PEBAs), copolymers comprising polyester blocks and PEG blocks (COPES) and their blends; and
   wherein the adhesive waterproof-breathable film has a thickness within a range of 5 μm to 25 μm.

2. The adhesive waterproof-breathable film of claim 1, in which:
   the percentage of thermoplastic starch represents from 10% to 90% by weight, and
   the percentage of hydrophilic TPE represents from 90% to 10% by weight, of total weight of the alloy.

3. The adhesive waterproof-breathable film of claim 1, further comprising a functionalized polyolefin comprising a grafting by a monomer chosen from the group consisting of unsaturated carboxylic acids, unsaturated carboxylic anhydrides, vinyl monomers, acrylic monomers and a mixture of these.

4. The adhesive waterproof-breathable film of claim 3, in which the functionalized polyolefin is chosen from the group consisting of ethylene/acrylic ester copolymers, ethylene/acrylic ester/maleic anhydride copolymers and ethylene/acrylic ester/glycidyl methacrylate copolymers.

5. A laminated product comprising at least one textile material and at least one waterproof-breathable film as claimed in claim 1, said film adhering to at least one surface of the textile material with a peel strength within the range from 0.5 to 50 N.

6. The laminate as claimed in claim 5, in which said at least one textile material is provided in the form of a porous membrane, of a woven textile or of a nonwoven textile.

7. The laminate as claimed in claim 5, in which said at least one textile material comprises synthetic fibers, natural fibers, artificial fibers manufactured from natural starting materials, mineral fibers and/or metal fibers.

8. The laminate as claimed in claim 5, in which said at least one textile material constitutes a felt, a filter, a film, a gauze, a cloth, a dressing, a layer, a fabric, an item of knitwear, an item of clothing, a garment, an item of bedding, an item of furniture, a curtain, a compartment covering, a functional technical textile, a geotextile and/or an agrotextile.

9. The adhesive waterproof-breathable film of claim 1, wherein the at least one other hydrophilic TPE comprises a copolymer comprising polyamide blocks and PEG blocks (PEBAs).

10. The adhesive waterproof-breathable film of claim 1, wherein the at least one other hydrophilic TPE comprises a copolymer comprising polyester blocks and PEG blocks (COPEs).

11. An adhesive waterproof-breathable film comprising an alloy of thermoplastic starch and of hydrophilic thermoplastic elastomer (TPE), said hydrophilic TPE comprising at least 50% by weight of polyethylene glycol (PEG), with regard to total weight of said hydrophilic TPE;
    wherein said hydrophilic TPE comprises:
       a copolymer comprising polyurethane blocks and PEG blocks (TPUs); and
       at least one other hydrophilic TPE chosen from the group consisting of:
          copolymers comprising polyamide blocks and PEG blocks (PEBAs), wherein the molecular weight of the PEG block is between 200 and 6000 g/mol;
          copolymers comprising polyester blocks and PEG blocks (COPEs), wherein the molecular weight of the PEG block is between 200 and 6000 g/mol;
          and their blends; and
    wherein the adhesive waterproof-breathable film has a thickness within a range of 5 μm to 25 μm.

12. The adhesive waterproof-breathable film of claim 11, in which:
    the percentage of thermoplastic starch represents from 10% to 90% by weight, and
    the percentage of hydrophilic TPE represents from 90% to 10% by weight, of total weight of the alloy.

13. The adhesive waterproof-breathable film of claim 11, further comprising a functionalized polyolefin comprising a grafting by a monomer chosen from the group consisting of unsaturated carboxylic acids, unsaturated carboxylic anhydrides, vinyl monomers, acrylic monomers and a mixture of these.

14. The adhesive waterproof-breathable film of claim 13, in which the functionalized polyolefin is chosen from the group consisting of ethylene/acrylic ester copolymers, ethylene/acrylic ester/maleic anhydride copolymers and ethylene/acrylic ester/glycidyl methacrylate copolymers.

15. The adhesive waterproof-breathable film of claim 11, wherein the at least one other hydrophilic TPE comprises a copolymer comprising polyamide blocks and PEG blocks (PEBAs).

16. The adhesive waterproof-breathable film of claim 11, wherein the at least one other hydrophilic TPE comprises a copolymer comprising polyester blocks and PEG blocks (COPES).

* * * * *